June 12, 1951 W. J. FARQUHARSON 2,556,494
COMBINATION LIQUID DISPENSER AND MIXER
Filed March 31, 1950

Inventor
WILLIAM J. FARQUHARSON
By: Fetherstonhaugh & Co.
Att'ys

Patented June 12, 1951

2,556,494

UNITED STATES PATENT OFFICE 2,556,494

COMBINATION LIQUID DISPENSER AND MIXER

William James Farquharson, Toronto, Ontario, Canada

Application March 31, 1950, Serial No. 153,107

2 Claims. (Cl. 259—24)

This invention relates to a liquid dispenser and mixer combined in such manner that liquid may be dispensed into a mixing vessel as the latter is drawn up to enclose the mixer in the form of a driven beater.

The serving of pancakes, waffles, or the like in a restaurant requires that a daily store of batter be prepared at the beginning of the day, or that a large amount of batter be prepared and stored in individual containers. The batter, in many instances, is stored overnight and, though protected by refrigeration in most cases, nevertheless loses much of its freshness resulting in an inferior pancake or waffle as compared with such foods when prepared from a fresh batter.

According to this invention, a small vessel may have a measured amount of batter powder stored therein over a considerable period of time without affecting its properties. By adopting this procedure, water, milk, or other suitable liquid may be added to the powder just before the food serving is prepared and the powder is necessarily mixed with the liquid by a suitable beater.

It is a particular object of the invention to provide a liquid dispensing device in conjunction with a beater acting in such manner that the moving of a vessel with powder into beating position with the beater necessarily results in liquid being dispensed into the vessel.

With this and other objects in view, the invention will be appreciated in more detail with reference to the following specification taken in conjunction with the accompanying drawings.

Figures 1, 2:
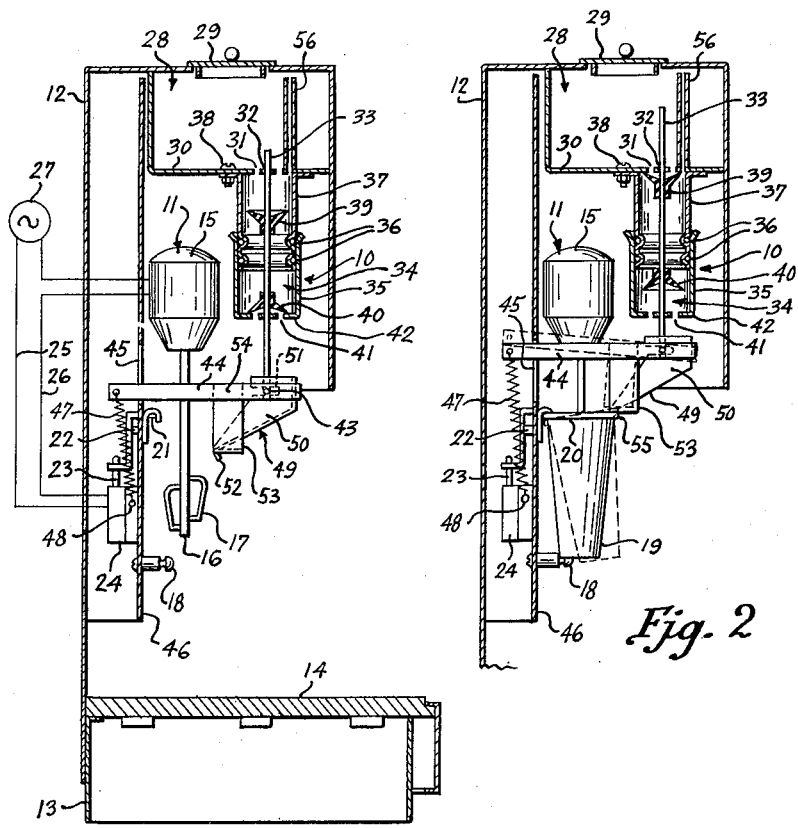
Figure 1 shows a sectional view of apparatus according to the invention mounted above a cooking grill.
Figure 2 illustrates the pertinent apparatus of the invention in different operative positions.

Referring in detail to the drawings, the apparatus of the invention comprises a liquid dispensing device 10 and a beater 11 arranged cooperatively and mounted on a suitable frame 12 which may be supported by a frame 13 carrying in its top surface a suitable grill 14 such as may be useful in the cooking of pancakes.

The beater 11 comprises the motor portion 15 having the downwardly extending spindle 16 mounting suitable beater members 17 at the free end thereof. A support 18 is designed to support a vessel, such as the cup 19 shown in Figure 2, in an upright position at which time the lip 20 of the cup engages the arm 21 causing the latter to pivot at the point 22 and actuate the arm 23 of the sensitive switch 24. The latter switch is connected by suitable leads 25 and 26 to control the electrical circuit of the motor 15 supplied by the source 27.

The liquid dispensing device 10 comprises an upper chamber 28 with a suitable cover 29 which may be removed to allow filling of the chamber with water, milk, or other suitable liquid. The bottom wall 30 of the chamber 28 has a series of holes 31 formed on a predetermined radius about a central hole 32, the latter being designed for passage of the valve rod 33. The fluid measuring chamber 34 is formed by the adjustable cup portion 35 adjustable over resilient sealing rings 36 which are set in the creased walls of the tubular body portion 37 fastened to the bottom wall 30 of chamber 28 by suitable screws 38.

Valve closure members 39 and 40 are mounted on the valve rod 33 and are preferably in the form of suction cups made of rubber-like material wherein the outside diameter is in excess of the diametric distance between the holes 31 of the bottom wall 30 of chamber 28 and the outlet ports 41 formed in the bottom wall 42 of the adjustable cup portion 35. The wall 42 also includes a central hole for accommodating the valve rod 33 which extends therebelow to connect to a cross-arm 43, which latter pivotally connects to a pair of spaced apart arms 44 which extend through vertical slots 45 in the support member 46 to mount a suitable spring 47 extending to a convenient point of anchorage 48. A suitable conveying trough 49 has side walls 50 slotted as at 51 to pass over the cross-arm 43, the lower end of the trough terminating in a lip 52 removably extending about a U-shaped actuating member 53 which is rigidly connected to the arms 44 as at 54.

In operation, the cup 19 is first moved to engage the U-shaped actuating member 53. It will be observed that the cup may only be moved upwardly to the position shown in dotted lines in Figure 2 by causing the rear portion 55 of the lip to engage the arm actuating member 53 by reason of the support member 18. Therefore, the arms 44 are moved upwardly until the arms and cup reach the position shown in dotted lines in Figure 2, at which point the valve member 40 is fully away from the openings 41 and the valve member 39 is fully closing the openings 31. Liquid will thus drain from the chamber 34 and this may be aided by employing an air pipe 56. The liquid will pass through the holes 41 down the trough 49 and into the cup 19. The cup may then be rotated to the position indicated in bold lines in Figure 2, whereby the motor switch is actuated. It will be observed, however, that the springs 47 will cause leverage on the arms 44 about the lip portion 55 of the cup to cause the valve member 39 to retain firm engagement with the bottom wall 30 of the chamber 28.

After the powder and liquid material has been sufficiently beaten and thus mixed, the cup is quickly removed, whereby the valve member 34 and the arms 44 quickly fall to the position illustrated in Figure 1, thus closing the holes 41. At such time, liquid will flow from the chamber 28 through the holes 31 to the chamber 34.

It should be noted that the cooperation of the components herein depends upon the relative positions of the valve actuating means, the vessel support, and the motor switch, so that while the vessel is being moved to actuate the motor switch the support obstructs such movement, thereby requiring the vessel to be urged through a path which actuates the liquid valve before the vessel can actuate the motor switch.

There will be many obvious alternatives in the specific valve actuating mechanism, the mechanism of the valves, the beating means and other details.

It is thus intended that this disclosure should not be limited in any sense other than that indicated by the scope of the following claims.

What I claim as my invention is:

1. In batter mixing apparatus wherein the batter is prepared in an independent vessel, the combination of: a support, an electric motor on said support having a beater member depending therefrom, switch means for said motor mounted on said support and actuable by said vessel only when said vessel is moved to a position wherein the beater member extends thereinto in a predetermined beating position, means extending from said support and adjacent the lower terminus of said beater member but spaced therefrom sufficiently to allow the passage of a side wall of said vessel and to support said vessel in the beating position to actuate said switch means, a liquid container mounted in said support, a liquid metering dispenser forming a part of said container and including a valve, and means for actuating said valve including an actuating member engageable by said vessel as the latter is moved to the beating position and actuable before said vessel actuates said switch means whereby liquid from said container is dispensed into said vessel before said beater member is rotated by said motor.

2. Batter mixing apparatus for mixing a batter in an independent vessel and comprising the combination of: a support, an electric motor on said support, a beater member driven by and depending from said motor, means extending from said support adjacent the free end of said beater member but spaced therefrom which, in conjunction with said support, allows a predetermined pathway for the vessel in moving to a position about said beater member and also serves to support said vessel in a batter mixing position, an electric switch for said motor mounted on said support and actuable by said vessel only when the latter is in the batter mixing position, a liquid container, mounted on said support, a liquid metering dispenser forming a part of said container and including a valve, and means for actuating said valve including an actuating member partially obstructing the pathway of said vessel as the latter is moved to the batter mixing position whereby the dispensing of liquid into said vessel is effected before said switch means are actuated to cause energizing of said electrical motor and rotation of said beater member.

WILLIAM JAMES FARQUHARSON.

REFERENCES CITED

The following references are of record in the file of this patent:

UNITED STATES PATENTS

| Number | Name | Date |
|---|---|---|
| 995,340 | Garnet | June 13, 1911 |
| 1,133,698 | Barney | Mar. 30, 1915 |
| 1,400,553 | Jenks et al. | Dec. 30, 1921 |
| 1,408,033 | Riedel | Feb. 28, 1922 |
| 1,521,038 | Moore | Dec. 30, 1924 |
| 1,810,554 | Costakos | June 16, 1931 |
| 2,158,948 | Rubens | May 16, 1939 |
| 2,366,343 | Ludwig | Jan. 2, 1945 |